(12) United States Patent
Begun et al.

(10) Patent No.: US 7,984,312 B2
(45) Date of Patent: Jul. 19, 2011

(54) SYSTEM AND METHOD FOR INTERCHANGEABLY POWERING SINGLE OR MULTIPLE MOTHERBOARDS

(75) Inventors: Ralph Murray Begun, Raleigh, NC (US); Raymond Mathew Clemo, Raleigh, NC (US); Brian Gormley, Chapel Hill, NC (US); Michael Sven Miller, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 11/956,889

(22) Filed: Dec. 14, 2007

(65) Prior Publication Data

US 2009/0158057 A1 Jun. 18, 2009

(51) Int. Cl.
*G06F 1/26* (2006.01)
(52) U.S. Cl. ......... 713/320; 713/300; 713/324; 710/305
(58) Field of Classification Search .................. 713/300, 713/320–324; 710/305
See application file for complete search history.

(56) References Cited

U.S. PATENT DOCUMENTS

| | | | |
|---|---|---|---|
| 5,632,039 A | | 5/1997 | Walker et al. |
| 5,680,536 A | * | 10/1997 | Tyuluman .......................... 714/1 |
| 5,761,459 A | * | 6/1998 | Schnoor et al. ............... 710/305 |
| 5,870,617 A | | 2/1999 | Walsh et al. |
| 6,367,021 B1 | | 4/2002 | Shay |
| 6,691,235 B1 | | 2/2004 | Garcia et al. |
| 6,836,848 B2 | | 12/2004 | Yu et al. |
| 6,988,211 B2 | | 1/2006 | Cline et al. |
| 7,028,195 B2 | | 4/2006 | Kasprzak et al. |
| 7,047,471 B2 | | 5/2006 | Monfared et al. |
| 7,149,905 B2 | | 12/2006 | Brown et al. |
| 2004/0054936 A1 | | 3/2004 | Dwyer, III et al. |
| 2007/0050582 A1 | | 3/2007 | Mangione-Smith |
| 2008/0037209 A1 | * | 2/2008 | Niazi et al. .................... 361/683 |

\* cited by examiner

*Primary Examiner* — Abdelmoniem Elamin
(74) *Attorney, Agent, or Firm* — Cynthia G. Seal; Jeffrey L. Streets

(57) ABSTRACT

In one embodiment, a single electrical power supply is used to interchangeably power either a single motherboard or dual motherboards. Switchable output power and individual sequencing may be provided to each motherboard using FETs, such that the power supply may respond to the sequencing of each motherboard as if it were dedicated to that motherboard. In a two motherboard system, power to the first motherboard is reduced by removing some output voltages from the first motherboard. Fault circuitry may also be provided so that a power related fault on one domain does not affect operation of the other motherboard.

18 Claims, 10 Drawing Sheets

| VOLTAGE SIGNAL DISTRIBUTION FOR MAIN POWER SECTION |||| 
|---|---|---|---|
| Main Power Section | Voltage Signals || Switch (FET) |
| | A domain | B domain | |
| +12V Bulk | 12V1A to 12V3A | | Q1 |
| | 12V4A to 12V5A | 12V1B to 12V3B | Q2* |
| +5V Bulk | 5VA —S1 | | Q3 |
| | | 5VB | Q4 |
| +3.3V Bulk | 3.3VA | | Q5 |
| | | 3.3VB | Q6 |
| −12V Bulk | −12VA | | Q7 |
| | | −12VB | Q8 |

*Board Configuration (switch S1 controls function of switch Q2)
single-board: P1 position 12V4A to 12V5A applied and removed by Gate A signal controlling Q2
dual-board: P2 position 12V1B to 12V3B applied and removed by Gate B signal controlling Q2

(HD signals not switched using a FET(Q); instead use ECB for −12VHD, +12VHD, +5VHD, and +3.3VHD)

FIG. 3

SYSTEM AND METHOD FOR INTERCHANGEABLY POWERING SINGLE OR MULTIPLE MOTHERBOARDS

BACKGROUND OF THE INVENTION

1. Field of the Invention

The present invention relates to systems and method of supplying electrical power to motherboards, such as may be used in server applications.

2. Description of the Related Art

Industry hardware manufacturers, led by Intel, have formed a Server System Infrastructure (SSI) consortium, to develop design standards for servers, much like those characteristic of desktop PCs. A stated goal of the SSI consortium is to enable future server market growth by standardizing interfaces between components including boards, chassis, and power supplies and by developing common server hardware elements. SSI has made an effort to develop a set of standards for server power supplies and motherboard bays.

One industry standard server configuration adopted under SSI includes one or more power supplies per electronic server bay. SSI standard documentation describes power supplies and server motherboards with signaling, power architecture and sequencing to accomplish this configuration. FIG. 1 is a schematic diagram of a conventional system configuration 10 according to the SSI standard, wherein a single power supply 12 is used to power a single motherboard 14. In a power-on sequence, alternating current (AC) is first applied at an AC input 16, providing five volts ("+5Vsb") to the motherboard 14 by way of a standby regulator 18 included with the power supply 12. A micro-controller 20 included with the motherboard 14 may go through some diagnostics before asserting a power-on signal "PSON#" to the power supply 12. The main power section 15 of the power supply responds to the PSON# signal with a "PWOK" (i.e. power OK) signal to inform the microcontroller that it has turned on the main power in the power supply 12. Turning on the main power in this manner provides power to the rest of the server motherboard 14. Bulk voltage outputs +12V, +5V, +3.3V, and −12V feed a main processing section 24 of the motherboard 14 that includes, for example, as processors (e.g., CPUs), memory (e.g., DIMMs), and applications cards (e.g., PCI cards). This specification reliably powers-up the single motherboard 14 with the single power supply 16.

However, current SSI standards do not provide much flexibility in configuring new server systems, even though server technology is still rapidly changing and server power management is more important that ever. A solution is desired to increase the flexibility of configuring power supplies and servers while maintaining consistency and compatibility with current SSI server and power supply standards.

SUMMARY OF THE INVENTION

One embodiment provides a system that includes a first motherboard configured for generating a first power-on signal and a second motherboard configured for generating a second power-on signal. An electrical power supply is configured for electrical communication with the first and second motherboards. The power supply has a plurality of bulk voltage outputs. Each bulk voltage output is configured for providing one or more output voltages to the first motherboard in response to receiving the first power-on signal and for providing one or more output voltages to the second motherboard in response to receiving the second power-on signal. The system may also include first and second FET controllers configured for generating, respectively, a first gate signal in response to the first power-on signal and a second gate signal in response to the second power-on signal. A first set of FETs in communication with the first FET controller may selectively switch the output voltages from each bulk voltage output to the first motherboard in response to the first gate signal. A second set of FETs in communication with the second FET controller may selectively switch the output voltages from each bulk voltage output to the second motherboard in response to the second gate signal. A "shared" FET in communication with the first and second FET controllers may be configured for switching a first set of output voltages from one of the bulk voltage outputs to the first motherboard or a second set of output voltages from the same bulk voltage output to the second motherboard.

Another embodiment provides a method of managing power to servers. A first power-on signal is selectively generated from a first motherboard. A second power-on signal is selectively generated from a second motherboard. The selectively generated first and second power-on signals are electronically detected. One or more output voltages are provided from each of a plurality of bulk voltage outputs to the first motherboard in response to detecting the first power-on signal. One or more output voltages from each of the plurality of bulk voltage outputs are provided to the second motherboard in response to detecting the second power-on signal. More output voltages may be supplied to the first motherboard in response to receiving only the first power-on signal than in response to receiving both the first power-on signal and the second power-on signal.

Other embodiments, aspects, and advantages of the invention will be apparent from the following description and the appended claims.

BRIEF DESCRIPTION OF THE DRAWINGS

FIG. 3 is a table summarizing the output voltages provided by the system of FIG. 2.

DETAILED DESCRIPTION OF PREFERRED EMBODIMENTS

The invention provides systems and methods for enabling a single electrical power supply to interchangeably power either a single motherboard or dual motherboards, such as the motherboards of SSI industry standard servers. For example, a power supply previously designed for powering one server up to 950 W may now, in accordance with the invention, be used to power two SSI industry standard 425 W servers. Switchable output power and individual sequencing may be provided to each motherboard, such that the power supply may respond to each motherboard's sequencing as if it were dedicated to that motherboard. The switchable power to each motherboard may be controlled by a system of transistors, such as field effect transistors (known in the art by the acronym "FET," and pronounced as a word), used to control the selection of output voltages supplied to each motherboard. For example, a single-board having a relatively high CPU wattage, high-power video cards, or a greater number of direct access storage devices (DASD) may be powered by a first power domain of the power supply. When dual motherboards are to be powered instead, power may also be supplied to a second power domain for powering a second motherboard, and power to the first domain may be correspondingly reduced to limit the net power consumption of the resulting dual-motherboard configuration. Among other things, reducing the net power consumption may help ensure proper cooling of the server. In one embodiment, power to the first domain may be reduced using a switch that selectively reduces the number of electrical outputs to the first domain in the dual-motherboard configuration. Fault circuitry may also be provided so that a fault on one motherboard does not affect operation of the other motherboard that is receiving power from the same power supply. Sequence and signal control may also be provided for hard drive(s) receiving power from the same power supply as the motherboard(s). For convenience, embodiments are discussed for interchangeably providing power to either one or two motherboards using a power supply. However, one skilled in the art having benefit of this disclosure will appreciate how the invention may be extended to embodiments in which more than two motherboards are powered with a power supply.

Figure 1:
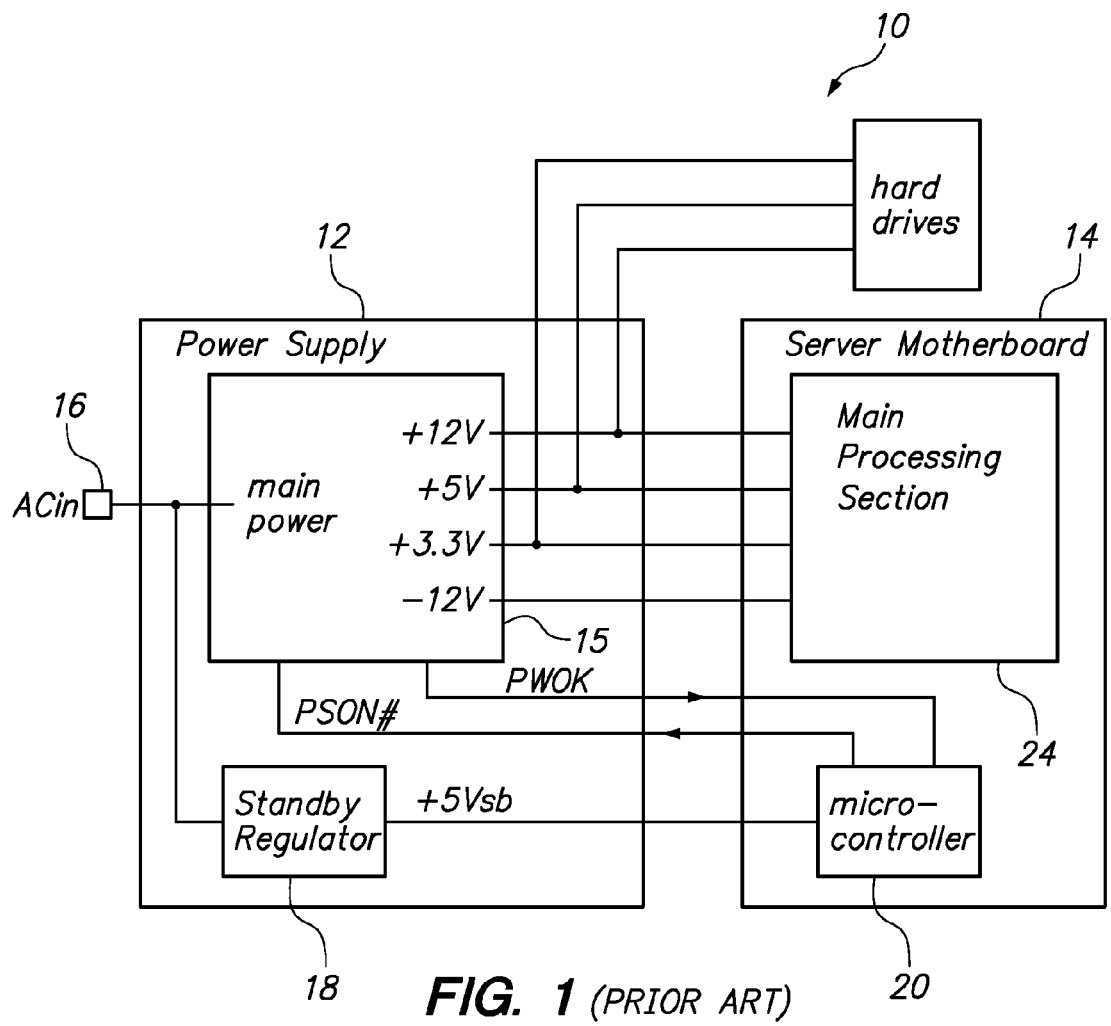
FIG. 1 is a schematic diagram of a prior art system configuration according to the SSI standard, wherein a single power supply is used to power a single motherboard.
Figure 2:
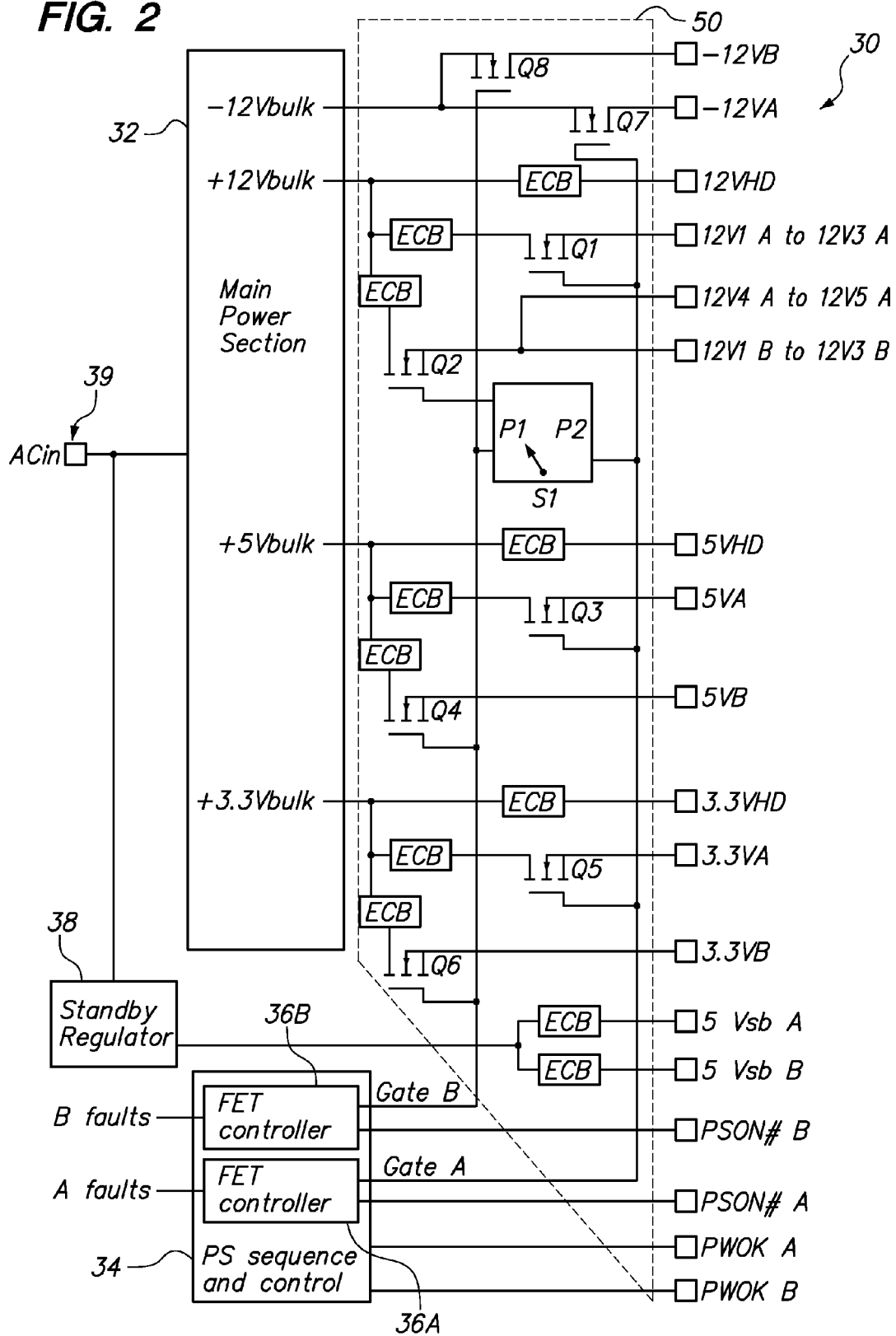
FIG. 2 is a schematic diagram of an exemplary power supply circuit used to interchangeably provide power to either one or two motherboards.

FIG. 2 is a schematic diagram of an exemplary power supply circuit, generally indicated at 30, used to provide power to a first motherboard in a first power domain "A" and, optionally, to concurrently provide power to a second motherboard in a second power domain "B". By convention, a voltage, signal, or circuit element either prefaced or ending with an "A" or a "B" pertains to power domain A or domain B, respectively, and is configured to logically and physically associate a first motherboard A or a second motherboard B, respectively. A main power section 32 of the power supply may provide from one to a plurality of bulk voltage outputs, typical examples of which are listed as 12Vbulk, −12Vbulk, 5Vbulk, and 3.3Vbulk. Each bulk voltage output is capable of generating one or more output voltages of like voltage magnitudes in each power domain (A and B) for selectively powering motherboards A and B, respectively. Specifically, the bulk voltage output +12Vbulk selectively supplies five nominally 12-volt output voltages ("outputs") 12V1A to 12V5A in domain A and three nominally 12-volt outputs 12V1B to 12V3B in domain B. The set of output voltages 12V1A to 12V3A and the set of output voltages 12V4A to 12V5A are each schematically illustrated as residing on a single rail, but each individual output voltage may alternatively be supplied on a separate rail, such as to provide each rail and corresponding output voltage with its own electronic circuit breaker (ECB). Alternatively, a set of output voltages (e.g. all five output voltages 12V1A to 12V5A) may be consolidated on a single ECB if protection is provided mechanically. The bulk voltage output +5Vbulk selectively supplies a nominally 5-volt output 5VA in domain A and a nominally 5-volt output 5VB in domain B. The bulk voltage output +3.3V selectively supplies a nominally 3.3-volt output 3.3VA in domain A and a nominally 3.3-volt output 3.3VB in domain B. The bulk voltage output −12Vbulk supplies an output voltage −12VA in domain A and an output voltage −12VB in domain B. As discussed further below, a power distribution circuit 50 that includes a first FET controller 36A, a second FET control 36B and FETs Q1 through Q8 distributes power from the main power section 32 to one or two motherboards. As discussed further below, selected output voltages are coupled to voltage inputs on a motherboard in the respective domain. The output voltages provided by the respective domains are summarized in the table of FIG. 3, which may also be referenced as desired in connection with the discussion of the other figures. Whether one or two motherboards are to be powered, there is always one motherboard powered by domain A. When the optional second motherboard is added, it will always be powered by domain B. If there is only one motherboard in the server and it needs more power than domain A can provide, additional power can be obtained by setting the switch S1 to position 1 and using 12V4A to 12V5A.

The output voltages are "switchable" using a system of transistors to selectively supply output voltages generated at the bulk voltage output to voltage inputs of a motherboard. The transistors used in this embodiment are field-effect transistors (FET) designated Q1 through Q8. A variety of types of FETs are known in the art, examples of which include a metal-oxide-semiconductor field-effect transistor (MOSFET), a junction field-effect transistor (JFET), a metal-semiconductor field-effect transistor (MESFET), and a modulation-doped field effect transistor (MODFET). The term "FET" will be used herein to generically denote any type of field-effect transistors. The table in FIG. 3 summarizes which output voltages are switched by the FETs Q1 through Q8. For example, Q1 selectively provides output voltages 12V1A to 12V3A from the bulk voltage output +12Vbulk to the motherboard in domain A, and Q8 selectively provides output voltage −12VB from bulk voltage output −12Vbulk to the motherboard in domain B.

Referring back to FIG. 2, a power-supply sequence and control circuit 34 includes a FET controller 36A that selectively generates a "Gate A" signal and a FET controller 36B that selectively generates a "Gate B" signal. The FETs Q1, Q3, Q5, and Q7 control the provision of output voltages to domain A in response to the Gate A, while FETs Q4, Q6, and Q8 control the provision of output voltages to domain B in response to the Gate B signal. Additionally, a FET Q2 is capable of providing output voltages to either domain A or domain B, but not both, depending on the position of a switch S1. When there is only one motherboard in the system, the switch S1 is in position 1 ("P1") and the Gate A signal controls the FET Q2. When there are two motherboards in the system, the switch S1 is in position 2 ("P2") and the Gate B signal controls the FET Q2. When the switch S1 is in the P1 position, the FET Q2 provides a first set of output voltages 12V4A to 12V5A from the bulk voltage output +12Vbulk to the motherboard in domain A in response to the Gate A signal. When the switch S1 is in the P2 position, the FET Q2 instead provides a second set of output voltages 12V1B to 12V3B from the same bulk voltage output +12Vbulk to the motherboard in domain B in response to the Gate B signal. The switch S1 in combination with the FET Q2 may be used to selectively reduce power to a board in domain A when a second motherboard is added to domain B. Thus, with the switch S1 in position P1, a total of five output voltages 12V1A to 12V5A are supplied to the motherboard in domain A. With the switch S1 in position P2, Q2 the two output voltages 12V4A and 12V5A are not applied to domain A and the three output voltages 12V1B to 12V3B are instead applied to domain B. Thus, moving the switch S1 from position P1 to position P2 supplies power to the motherboard in domain B while reducing the amount of power supplied to the motherboard in domain A.

The switch S1 is one example of a FET switch in communication with the FET Q2 for causing the FET Q2 to either provide a first set of output voltages 12V4A to 12V5A to the motherboard 40A in response to detection of the Gate A signal (and not the Gate B signal) or a second set of output voltages 12V1B to 12V3B in response to the Gate B signal. In that context, the FET Q2 may be referred to herein as a "shared" FET. The switch S1 may be a mechanical switch, as illustrated, and the position of the mechanical switch may be selected by a system administrator, technician, or other user, according to whether one or two motherboards are desired to be powered. However, the same functionality may be provided by another mechanism in lieu of a mechanical switch. For example, an external signal going to a control circuit in the power supply sequence and control circuit 34, or, more generally, in the power supply circuit 30, may be used to control whether Q2 responds to Gate A or Gate B.

Figure 4:
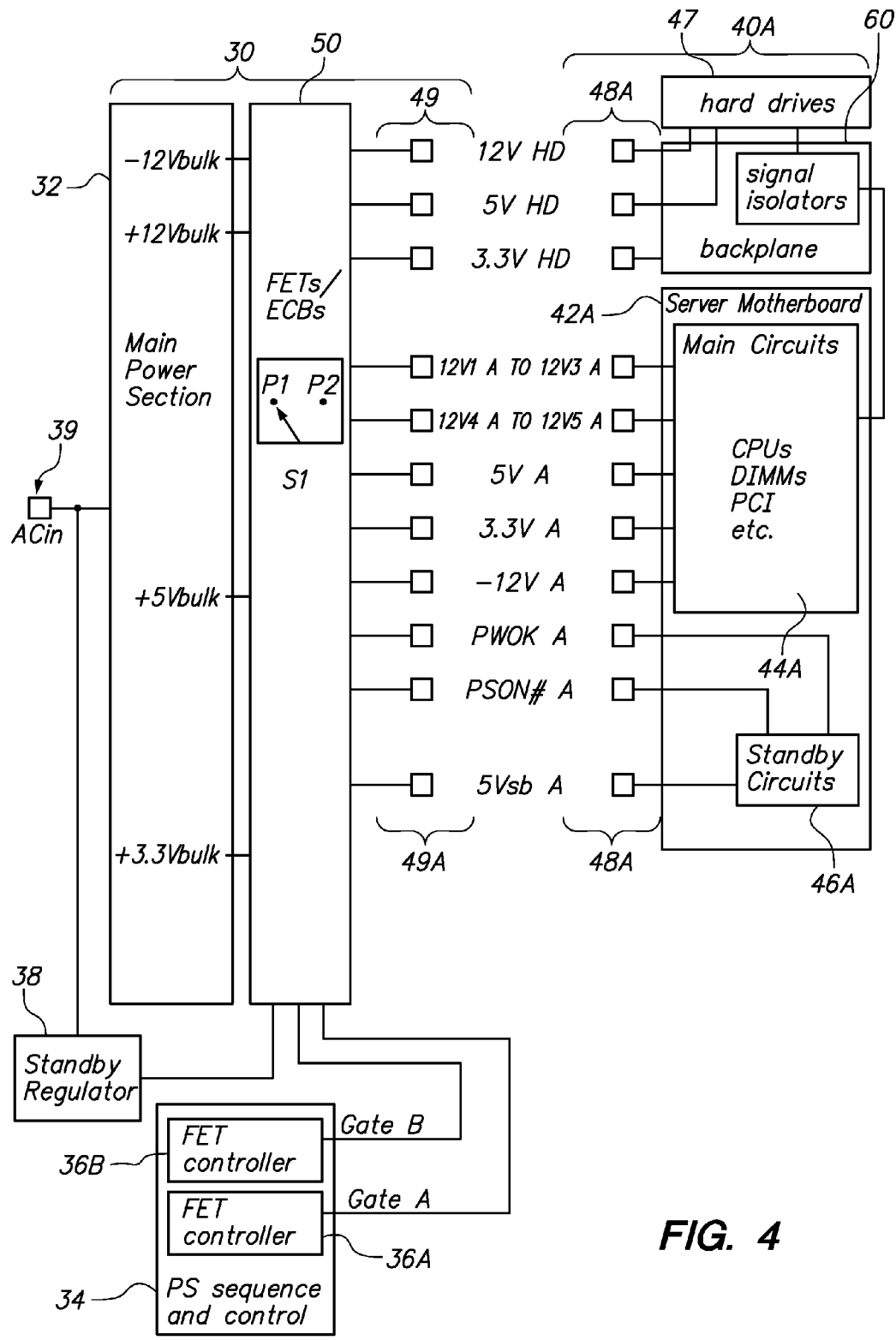
FIG. 4 is a schematic diagram of the power supply circuit being used to power a single server in domain A.

FIG. 4 is a schematic diagram of the power supply circuit 30 being used to power a single server 40A having a server motherboard 42A in domain A. The server motherboard 42A includes a main processing section 44A having, for example, processors (e.g., CPUs), memory (e.g., DIMMs), and applications cards (e.g., PCI cards). Circuits in the main processing section may each be designed to operate on a particular voltage, such as on any of a variety of industry standard operating voltages. For example, some circuits may be designed to operate on +12V, such as supplied by the bulk voltage output +12Vbulk of the main power section 32. Other circuits may be designed to operate on 5V, and still other circuits may be designed to operate on 3.3V. Thus, a plurality of voltage inputs 48A to circuits on the motherboard 44A are connected to respective voltage outputs 49A provided by the power supply circuit 30 according to the operating voltage of the circuits to be powered. It should be noted that the ordering of the voltage inputs 48A on the page is not necessarily the same as shown schematically in FIG. 2. Generally, voltage outputs are paired with voltage inputs of like voltage magnitudes and domain.

Alternating current (AC) is provided to the power supply circuit at a current source 39. It would be possible to configure the power supply 30 so that when AC from the current source 39 is supplied, 5Vsb, 12V bulk, 12V-HD, 5Vbulk, 5V-HD, 3.3Vbulk, and −12V all come up. However, in this embodiment, an optional standby regulator 38 is included in the power supply circuit 30, which provides a standby voltage 5Vsb to a standby circuit 46A on the motherboard 44A. As a precaution, the standby circuits 46A typically execute diagnostics before asserting a power-on signal "PSON#A." These diagnostics and the resulting PSON#A signal may be initiated automatically by the standby circuits 46A in response to the motherboard 40A being connected to the power supply circuit 30 and receiving the standby voltage 5Vsb. The main power section 32 of the power supply circuit 30 responds to the PSON#A signal with a "PWOK A" signal to turn on main power to the motherboard 44A within domain A. The FET controller 36A generates the Gate A signal, in response to which Q1 switches on the output voltages 12V1A to 12V3A, Q3 switches on the output voltage 5VA, Q5 switches on the output voltage 3.3VA, and Q7 switches on the output voltage −12VA, all of which are thereby supplied to domain A. Additionally, because the switch S1 is in the P1 position, Q2 switches on the output voltages 12V4A and 12V5A in response to the Gate A signal. The additional provision of output voltages 12V4A and 12V5A to domain A increases the power provided to the motherboard 44A.

One or more hard drive 47 may provide long-term memory storage to the server 40A. The hard drive(s) 47 may be powered by the bulk voltage outputs 12Vbulk, 5Vbulk, 3.3Vbulk and −12Vbulk provided to the hard drive backplane 60. Power to the hard drive(s) 47 is not switched with FETs like power to the motherboard 44A. Rather, power from the output voltages 12VHD, 5VHD and 3.3VHD goes only through respective electronic circuit breakers or "ECBs" (see FIG. 2). If an overload on one of the HD voltages is detected, the main power section 32 will shut down. Alternatively, power to each hard drive may come from, and be controlled by, its respective motherboard.

Figure 5:
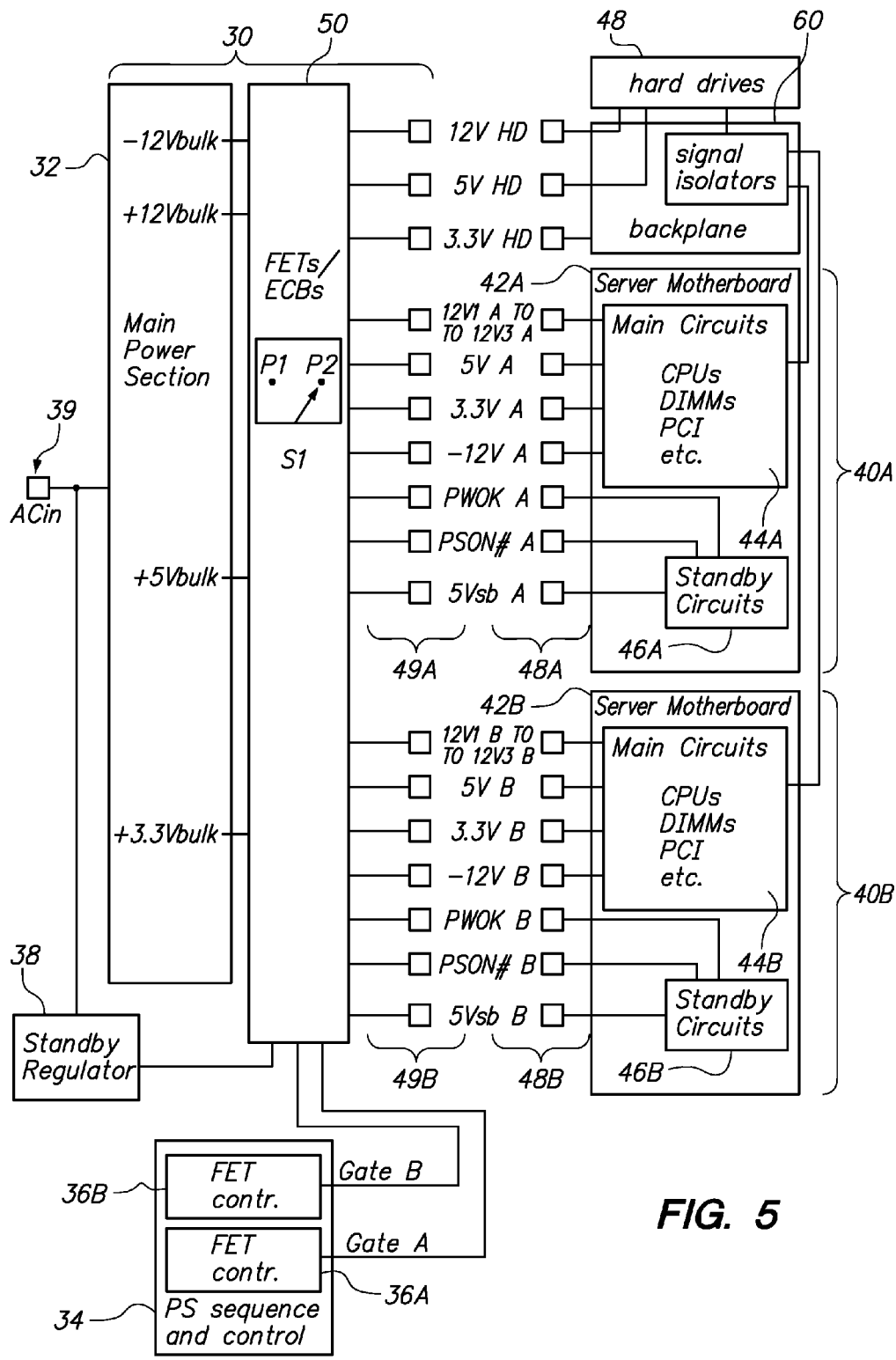
FIG. 5 is a schematic diagram of the power supply circuit being used to power both the server in domain A and another server in domain B.

FIG. 5 is a schematic diagram of the power supply circuit 30 now being used to power both the server 40A in domain A and another server 40B in domain B. The server motherboard 42B includes a main processing section 44B having, for example, processors (e.g., CPUs), memory (e.g., DIMMs), and applications cards (e.g., PCI cards). Circuits in the main processing section 44B may each be designed to operate on a particular voltage, such as any of a variety of industry standard operating voltages. For example, some circuits may be designed to operate on +12V, as supplied by the bulk voltage output +12Vbulk of the main power section 32. Other circuits may be designed to operate on 5V, and still other circuits may be designed to operate on 3.3V. Thus, a plurality of voltage inputs 48B to circuits on the motherboard 44B are connected to voltage outputs 49B provided by the power supply circuit 30 according to the operating voltage of the circuits to be powered.

The optional standby regulator 38 in the power supply circuit 30 provides a standby voltage 5Vsb both to the standby circuit 46A of the first motherboard 44A and to the standby circuit 46B of the second motherboard 44B. The standby voltages 5Vsb are split off through two respective ECBs, to prevent an overload fault on one of the motherboards 44A, 44B from impacting the other. If one of the ECBs trips, the tripped ECB removes the voltages from the failing motherboard only. As with the single-motherboard configuration of FIG. 4, the standby circuits 46A may go through some diagnostics before asserting the power-on signal PSON#A and the standby circuits 46B may go through some diagnostics before asserting a power-on signal PSON#B. The main power section 32 of the power supply circuit 30 responds to the PSON#A signal with a "PWOK-A" signal, and the power supply circuit 30 responds to the PSON#B signal with a "PWOK-B" signal.

The first FET controller 36A generates the Gate A signal to turn on main power to the motherboard 44A in domain A and the second FET control 36B generates the Gate B signal to turn on main power to the motherboard 44B in domain B. Specifically, in domain A, Q1 switches on the output voltages 12V1A to 12V3A, Q3 switches on the output voltage 5VA, Q5 switches on the output voltage 3.3VA, and Q7 switches on the output voltage −12VA, providing these output voltages to the motherboard 44A. However, because the switch S1 is in the P2 position, Q2 does not switch on the output voltages 12V4A and 12V5A in response to the Gate A signal. Rather, Q2 will instead switch on the output voltages 12V1B to 12V3B to the motherboard 44B in domain B in response to receiving the Gate B signal. Additionally in domain B, Q4 switches on the output voltage 5VB, Q6 switches on the output voltage 3.3VB, and Q8 switches on the output voltage −12VB in response to receiving the Gate B signal. As a result, the power supply circuit 30 supplies fewer output voltages to the motherboard 40A in domain A in response to receiving both power-on signals PSON#A and PSON#B than in response to receiving only the power-on signal PSON#A. Stated differently, the power supply circuit 30 provides more output voltages to the motherboard in domain A in response to receiving only the power-on signal PSON#A than in response to receiving both power-on signals PSON#A and PSON#B. The removal of output voltages 12V4A and 12V5A resulting from moving the switch S1 to position P2 decreases the power provided to the motherboard 44A in domain A, as compared with the amount of power supplied to the motherboard 44A by all five output voltages 12V1A to 12V5A when the switch S1 was in position P1 (see FIG. 4).

The hard drive(s) 47 may be shared by the servers 40A and 40B or the hard drive(s) may include at least one hard drive for the server 40A and one hard drive for the server 40B. As in the single-server use of FIG. 4, the hard drive(s) 47 in the dual-server use of FIG. 5 may still be powered by the bulk voltage outputs 12Vbulk, 5Vbulk, 3.3Vbulk and −12Vbulk via the hard drive backplane 60. Again, power to the hard drive backplane 60 is provided by the output voltages 12VHD, 5VHD and 3.3VHD, which go through respective ECBs. If an overload on one of the HD voltages is detected, the main power section 32 will shut down.

In the event of a fault, the domain ECBs provide a fault signal, indicating an overcurrent condition. This signal is then used to remove remaining power to the appropriate domain. In particular, an "A fault" signal, generated by one of the domain A ECBs, is provided to the FET controller 36A in response to a fault with motherboard 40A and a "B fault" signal, generated by one of the domain B ECBs, is provided to the FET controller 36B in response to a fault with motherboard 40B. In response to receiving the A or B fault signal, the respective FET controller 36A or 36B may invoke a response to protect the respective motherboard 40A or 40B. The respective FET controller 36A or 36B may de-assert the respective PWOK signal in the case of a fault that occurs after startup.

Figure 6:
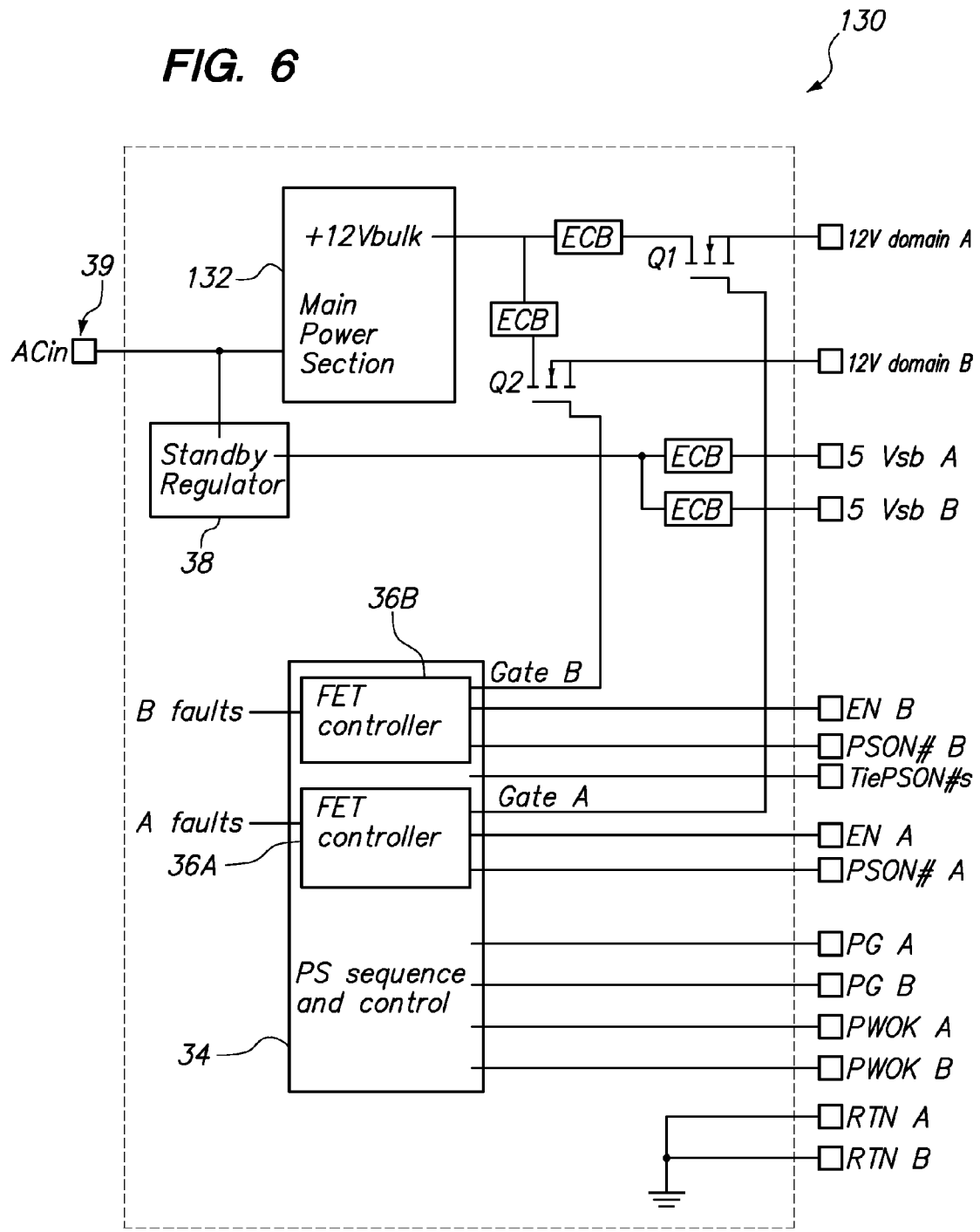
FIG. 6 is a schematic diagram of another variation of a power supply circuit that may be used to power the motherboards in domain A and domain B.

FIG. 6 is a schematic diagram of another variation of a power supply circuit, generally indicated at 130, that may be used to power the motherboards in domain A and domain B. The power supply circuit 130 may share many of the same circuit elements as the power supply circuit 30 (FIG. 2), such as the standby regulator 38 (still providing +5Vsb) and the power supply sequence and control circuit 34. However, the main power section 132 in this embodiment includes only one bulk voltage output +12Vbulk. As illustrated in FIGS. 7 and 8, paddle cards may be added to the power supply circuit 130 to provide any additional bulk voltage outputs such as 5V, 3.3V, and −12V for each domain A and B in either a single-motherboard configuration or a dual-motherboard configuration.

Figure 7A:
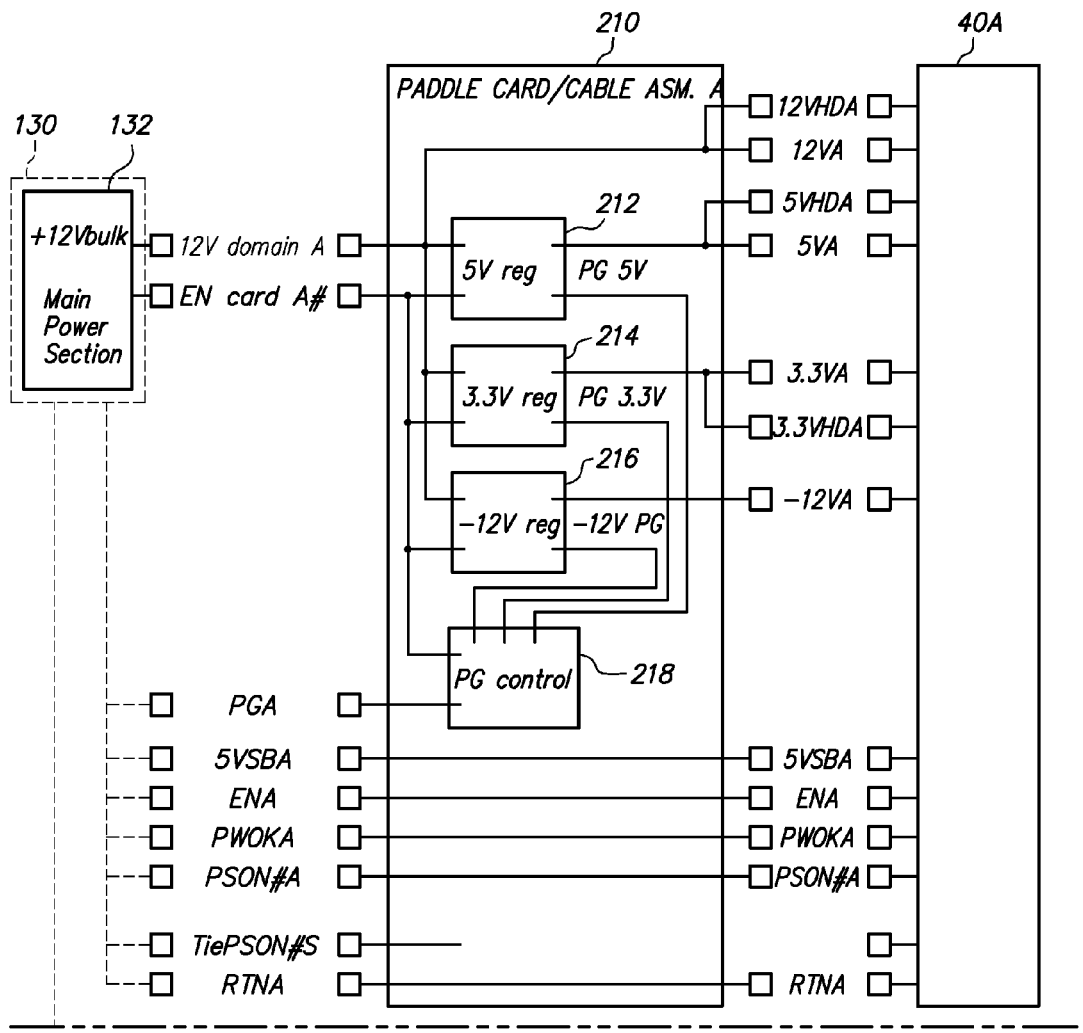
FIGS. 7A and 7B are split upper and lower sections of a schematic diagram of a paddle card and cable assembly system as used in a dual-motherboard configuration for powering the first motherboard in domain A and the second motherboard in domain B.
Figure 7B:
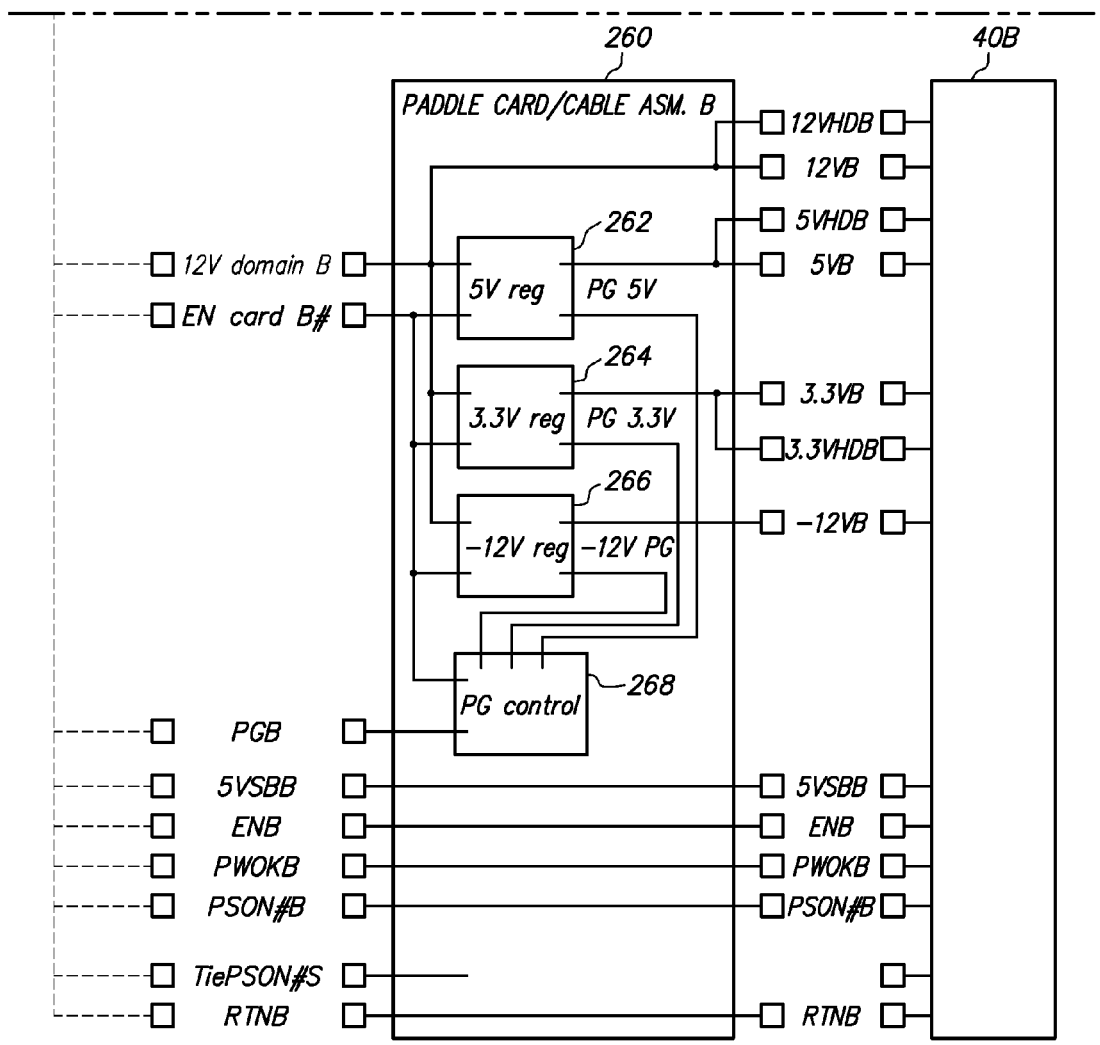

FIGS. 7A and 7B (referred to collectively as FIG. 7) are split upper and lower sections of a schematic diagram of a paddle card and cable assembly system 200, as used in a dual-motherboard configuration for powering the first motherboard in domain A and the second motherboard in domain B. The paddle card and cable assembly system 200 includes a first paddle card and cable assembly 210 for providing 5Vsb, 12VHD, 12VA, 5VA, 3.3VA, and −12VA. The output voltages 12VHD, 12VA, 5VA, 3.3VA, and −12VA are derived from the bulk voltage output 12Vbulk of the main power section 132 in the power supply circuit 130 (see FIG. 6). The paddle card 210 includes a 5V regulator 212 for providing 5VA, a 3.3V regulator 214 for providing 3.3VA, and a −12V regulator 216 for providing −12VA. The standby voltage 5Vsb is passed through from the power supply circuit 130. Two handshaking signals between the power supply circuit 130 and the paddle card cable assemblies 200, Enable card A# (EN card A#) and Power Good (PG A), help control sequencing of the 12V, 5V, 3.3V and −12V outputs going to the motherboard. After receiving an asserted PSON# signal passed through the paddle card and cable assembly 210 from the motherboard, the power supply circuit 130 asserts EN card A#. The paddle card and cable assembly 210, having received EN card A# asserted, turns on its regulators 212, 214 and 216. When the PG control circuit 268 is informed that the paddle card and cable assembly regulators are up and running, the PG control circuit 268 asserts PG A to power supply circuit 130. The power supply circuit 130, having received PG A asserted, and, assuming 12Vbulk is properly up, then asserts PWOK A, which is passed through the paddle card and cable assembly to the motherboard. The resulting domain A output voltages 12VHDA, 12VA, 5VA, and −12VA may be applied to the motherboard 40A, as in the dual-motherboard configuration of FIG. 5. Likewise, a second paddle card 260 may provide 5Vsb, 12VHDB, 12VB, 5VB, 3.3VB, and −12VB, with sequencing as described for paddle card and cable assembly 210. The paddle card 260 includes a 5V regulator 262 for providing 5VB, a 3.3V regulator 264 for providing 3.3VB, and a −12V regulator 266 for providing −12VB. The resulting domain A output voltages 12VHDA, 12VA, 5VA, and −12VA may be applied to the motherboard 40A and domain A hard drive(s), and the resulting domain B output voltages 12VHDB, 12VB, 5VB, and −12VB may be applied to the motherboard 40B and domain B hard drive(s), in substantially the same way as like output voltages were provided to the motherboards 40A and 40B and domain A and B hard drives in the dual-motherboard configuration of FIG. 5.

Figure 8A:
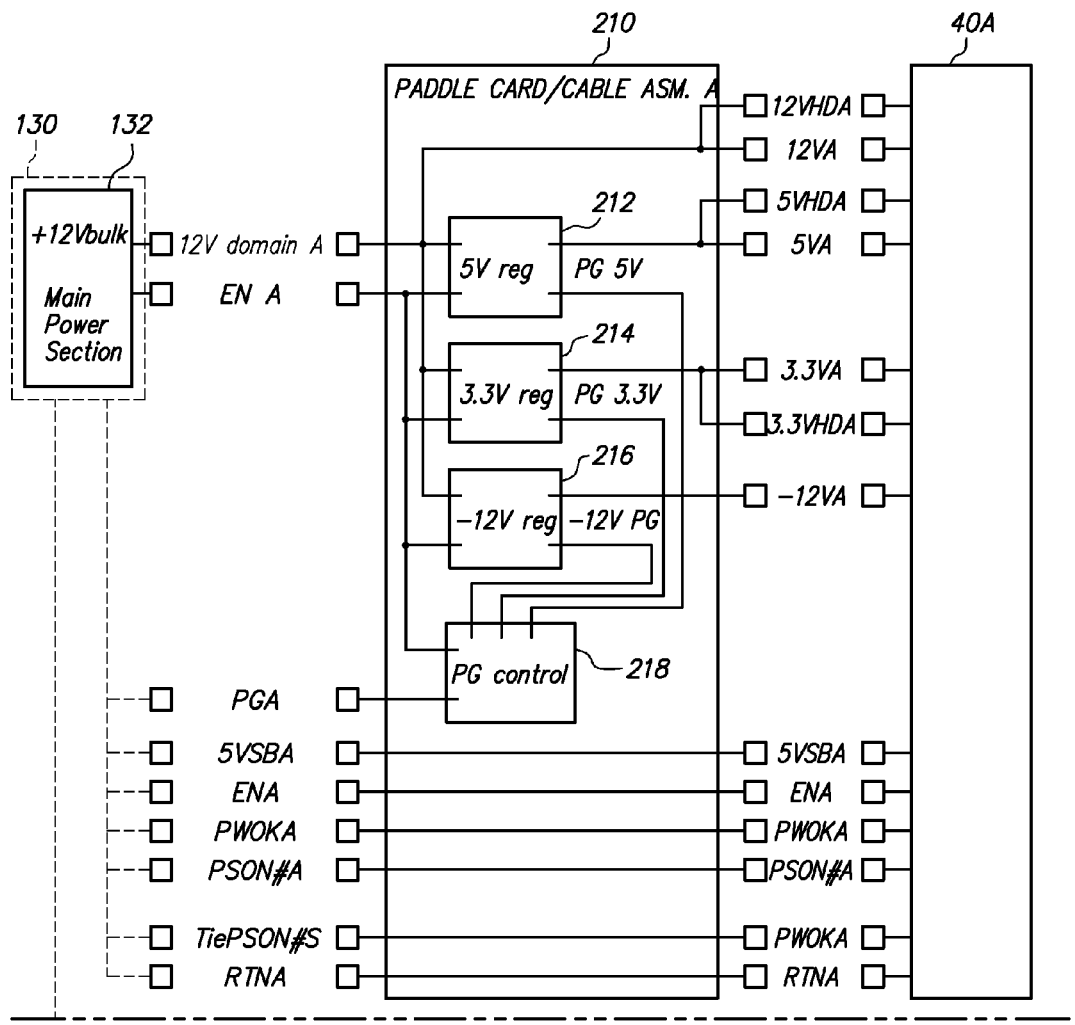
FIGS. 8A and 8B are split upper and lower sections of a schematic diagram of the paddle card and cable assembly system of FIGS. 7A and 7B, as used in a single-motherboard configuration for powering the first motherboard in domain A and with no motherboard in domain B.
Figure 8B:
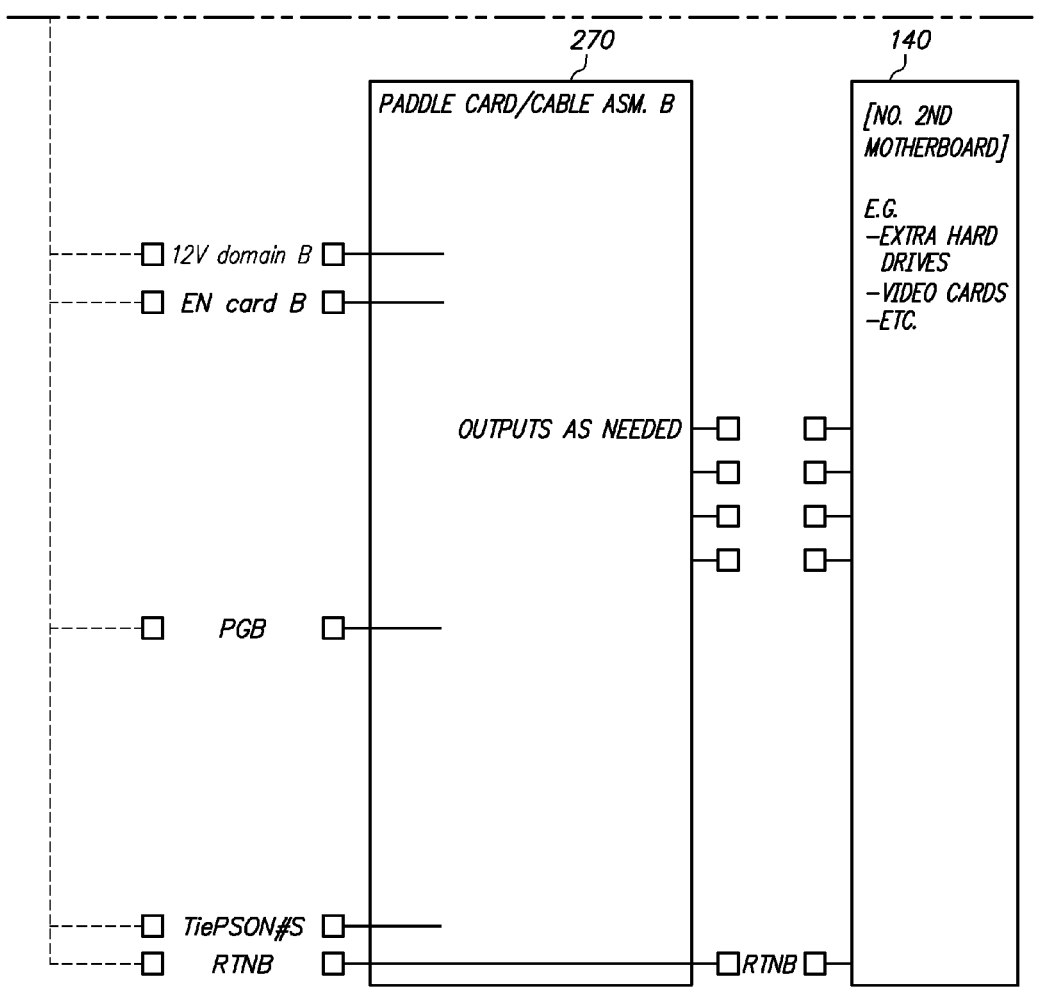

FIGS. 8A and 8B (referred to collectively as FIG. 8) are split upper and lower sections of a schematic diagram of the paddle card and cable assembly 210 as used in a single-motherboard configuration for powering the first motherboard 40A in domain A, with no motherboard in domain B. The domain A output voltages 12VHDA, 12VA, 5VA, and −12VA may be generated and applied to the motherboard 40A, as they were in the dual-motherboard configuration of FIG. 7. However, another paddle card and cable assembly 270, which receives input from 12V domain B of the power supply, is different from the paddle card and cable assembly 260 of FIG. 7, as indicated in that the schematic diagram by the notation "outputs as needed." In particular, the paddle card and cable assembly 270 may be configured as needed for powering particular features, like extra hard drives or video cards generally indicated at 140, to be optionally powered by domain B. The signal Tie PSON#s in cable card 270 is tied to ground. This is different from than the signal routing of the paddle card and cable assembly 210 in FIGS. 7 and 8 and paddle card and cable assembly 260 in FIG. 8, where the signal is drawn as floating. The power supply recognizes that Tie PSON#s is tied to ground and causes it to bring 12V domain A and 12V domain B with the same effect as having S1 in FIG. 2 in the P1 position.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
    a first motherboard configured for generating a first power-on signal;
    a second motherboard configured for generating a second power-on signal;
    an electrical power supply configured for electrical communication with the first and second motherboards, the power supply having a plurality of bulk voltage outputs, each bulk voltage output configured for providing one or more output voltages to the first motherboard in response to receiving the first power-on signal and for providing one or more output voltages to the second motherboard in response to receiving the second power-on signal;
    first and second FET controllers configured for generating, respectively, a first gate signal in response to the first power-on signal and a second gate signal in response to the second power-on signal;
    a first set of FETs in communication with the first FET controller for selectively switching the output voltages from each bulk voltage output to the first motherboard in response to the first gate signal; and
    a second set of FETs in communication with the second FET controller for selectively switching the output voltages from each bulk voltage output to the second motherboard in response to the second gate signal.

2. The system of claim 1, wherein the power supply is configured for supplying more output voltages to the first motherboard in response to receiving only the first power-on signal than in response to receiving both the first power-on signal and the second power-on signal.

3. The system of claim 1, further comprising:
    a FET in communication with the first and second FET controllers and configured for switching a first set of output voltages from one of the bulk voltage outputs to the first motherboard or a second set of output voltages from the same bulk voltage output to the second motherboard; and
    a FET switch in communication with the FET for causing the FET to either provide the first set of output voltages to the first motherboard in response to the first gate signal and not the second gate signal or to provide the second set of output voltages to the second motherboard in response to the second gate signal.

4. The system of claim 3, wherein the FET switch comprises a mechanical switch having at least two positions, wherein one of the two positions causes the shared FET to provide the first set of output voltages to the first motherboard and another of the two positions causes the FET to provide the second set of output voltages to the second motherboard.

5. The system of claim 1, wherein each bulk voltage output generates a different voltage magnitude.

6. The system of claim 5, wherein each bulk voltage output generates an output voltage selected from the group consisting of −12V, +12V, +5V, and +3.3V.

7. The system of claim 1, wherein the first motherboard is configured to generate the first power-on signal in response to being connected to the electrical power supply and the second motherboard is configured to generate the second power-on signal in response to being connected to the electrical power supply.

8. The system of claim 1, further comprising a standby regulator providing a standby voltage to the first and second motherboards, wherein the first motherboard is configured to generate the first power-on signal in response to receiving the standby voltage and the second motherboard is configured to generate the second power-on signal in response to receiving the second standby voltage.

9. A system, comprising:
    a first motherboard configured for generating a first power-on signal;
    a second motherboard configured for generating a second power-on signal;
    an electrical power supply configured for electrical communication with the first and second motherboards, the power supply having a plurality of bulk voltage outputs, each bulk voltage output configured for providing one or more output voltages to the first motherboard in response to receiving the first power-on signal and for providing one or more output voltages to the second motherboard in response to receiving the second power-on signal; and
    fault detection circuitry for detecting a fault on one of the first and second motherboards and removing the one or more output voltages from the motherboard on which the fault was detected.

10. The system of claim 9, wherein the fault detection circuitry is configured to remove the one or more output voltages from the motherboard having the fault by de-asserting the power-OK signal to the motherboard having the fault.

11. A method of managing power to servers, comprising:
    selectively generating a first power-on signal from a first motherboard and a second power-on signal from a second motherboard;
    electronically detecting the selectively generated first and second power-on signals;
    providing one or more output voltages from each of a plurality of bulk voltage outputs to the first motherboard in response to detecting the first power-on signal;
    providing one or more output voltages from each of the plurality of bulk voltage outputs to the second motherboard in response to detecting the second power-on signal; and
    supplying more output voltages to the first motherboard in response to receiving only the first power-on signal than in response to receiving both the first power-on signal and the second power-on signal.

12. The method of claim 11, further comprising providing a first set of output voltages from a selected bulk voltage output to the first motherboard in response to detecting the first power-on signal and not the second power-on signal; and
    providing a second set of output voltages from the selected bulk voltage output to the second motherboard in response to detecting the second power-on signal, such that providing the first set of output voltages from the selected bulk voltage output to the first motherboard and providing the second set of output voltages from the selected bulk voltage output to the second motherboard are mutually exclusive events.

13. The method of claim 12, further comprising:
    generating a first gate signal in response to the first power-on signal;

using FETs to provide the one or more output voltages from each of the plurality of bulk voltage outputs to the first motherboard in response to the first gate signal;
generating a second gate signal in response to the second power-on signal; and
using FETs to provide the one or more output voltages from each of the plurality of bulk voltage outputs to the second motherboard in response to detecting the second gate signal.

14. The method of claim 13, further comprising:
using a FET by the first and second motherboards to selectively provide the first set of output voltages to the first motherboard or the second set of output voltages to the second motherboard from the selected bulk voltage output.

15. The method of claim 14, further comprising:
using a FET controller to control whether the FET provides the first set of output voltages to the first motherboard or the second set of output voltages to the second motherboard.

16. The method of claim 15, wherein the FET controller comprises a switch for controlling whether the first gate signal causes the FET to provide the first set of output voltages to the first motherboard or whether the second gate signal causes the FET to provide the second set of output voltages to the second motherboard.

17. The method of claim 11, further comprising:
generating a fault signal in response to a power related fault with one of the first or second motherboards; and
removing the one or more output voltages from the motherboard that has the power related fault; and
continuing to provide the one or more output voltages to the other of the first and second motherboards.

18. The method of claim 17, wherein the step of removing the one or more output voltages from the motherboard having the fault comprises de-asserting the power-OK signal to the motherboard having the fault.

* * * * *